United States Patent
Rasmussen et al.

(10) Patent No.: US 9,853,737 B2
(45) Date of Patent: Dec. 26, 2017

(54) BIAS CONTROL OF NESTED MACH-ZEHNDER MODULATORS FOR THE GENERATION OF OPTICAL QAM SIGNALS

(71) Applicant: Acacia Communications, Inc., Maynard, MA (US)

(72) Inventors: Christian Rasmussen, Maynard, MA (US); Seo Yeon Park, Maynard, MA (US); Mehrdad Givehchi, Maynard, MA (US)

(73) Assignee: Acacia Communications, Inc., Maynard, MA (US)

( * ) Notice: Subject to any disclaimer, the term of this patent is extended or adjusted under 35 U.S.C. 154(b) by 0 days.

(21) Appl. No.: 14/615,350

(22) Filed: Feb. 5, 2015

(65) Prior Publication Data

US 2015/0270905 A1 Sep. 24, 2015

Related U.S. Application Data

(60) Provisional application No. 61/936,061, filed on Feb. 5, 2014.

(51) Int. Cl.
H04B 10/54 (2013.01)
H04B 10/50 (2013.01)

(52) U.S. Cl.
CPC ..... H04B 10/541 (2013.01); H04B 10/50575 (2013.01)

(58) Field of Classification Search
CPC .................................. H04B 10/5057–10/5563
USPC .................. 398/183, 185–189, 195–198, 201
See application file for complete search history.

(56) References Cited

U.S. PATENT DOCUMENTS

| | | | | |
|---|---|---|---|---|
| 7,266,306 B1* | 9/2007 | Harley | ................. | H04B 10/505 398/182 |
| 7,817,923 B2* | 10/2010 | Akiyama | .............. | G02F 1/0123 398/183 |
| 8,472,810 B2* | 6/2013 | Akiyama | ........... | H04B 10/5053 398/183 |
| 8,903,239 B2* | 12/2014 | Nishimoto | ....... | H04B 10/50572 398/182 |
| 8,909,067 B2* | 12/2014 | Takeguchi | ......... | H04B 10/5053 398/182 |
| 9,020,361 B2* | 4/2015 | Kawakami | ............ | G02F 1/0123 398/188 |
| 9,063,355 B2* | 6/2015 | Akashi | ................... | G02F 1/0123 |
| 9,312,961 B2* | 4/2016 | Le Taillandier De Gabory | ................ | H04B 10/516 |
| 2003/0185575 A1* | 10/2003 | Ikeuchi | ................ | G02F 1/0123 398/197 |
| 2003/0210914 A1* | 11/2003 | Khayim | ........... | H04B 10/50575 398/197 |
| 2004/0161249 A1* | 8/2004 | Suda | .................... | H04B 10/503 398/198 |
| 2005/0068600 A1* | 3/2005 | Ogura | ................... | G02F 1/0123 359/238 |
| 2006/0088322 A1* | 4/2006 | Kobayashi | ........... | H04B 10/505 398/198 |

(Continued)

*Primary Examiner* — Li Liu
(74) *Attorney, Agent, or Firm* — Wolf, Greenfield & Sacks, P.C.

(57) ABSTRACT

Disclosed are bias control methods for Mach-Zehnder modulators for the generation of optical QAM signals while ensuring correct I/Q polarity of the generated optical QAM signal. One exemplary method involves temporarily offsetting I and Q biases from ideal transmission null bias points while another illustrative method temporarily makes I and Q data streams identical.

18 Claims, 18 Drawing Sheets

(56) References Cited

U.S. PATENT DOCUMENTS

| | | | |
|---|---|---|---|
| 2007/0065161 A1* | 3/2007 | Miura | G02F 1/0123 398/186 |
| 2007/0177882 A1* | 8/2007 | Akiyama | G02F 1/2255 398/185 |
| 2008/0080872 A1* | 4/2008 | Tanaka | H04B 10/505 398/186 |
| 2008/0130083 A1* | 6/2008 | Yasuda | H04B 10/588 359/238 |
| 2009/0086303 A1* | 4/2009 | Ide | H04B 10/5561 359/279 |
| 2010/0067914 A1* | 3/2010 | Tanaka | H04B 10/5053 398/102 |
| 2010/0080571 A1* | 4/2010 | Akiyama | G02F 1/0123 398/184 |
| 2011/0013907 A1* | 1/2011 | Sugihara | G02F 1/0123 398/38 |
| 2013/0148981 A1* | 6/2013 | Yasuda | H04B 10/548 398/185 |
| 2013/0155482 A1* | 6/2013 | Toya | G02F 1/01 359/279 |
| 2014/0233963 A1* | 8/2014 | Le Taillandier De Gabory | H04B 10/516 398/183 |
| 2015/0050030 A1* | 2/2015 | Le Taillandier De Gabory | H04B 10/50595 398/183 |
| 2015/0215048 A1* | 7/2015 | Zhang | H04B 10/50575 398/38 |
| 2015/0236792 A1* | 8/2015 | Sugihara | H04B 10/516 398/183 |

\* cited by examiner

BIAS CONTROL OF NESTED MACH-ZEHNDER MODULATORS FOR THE GENERATION OF OPTICAL QAM SIGNALS

CROSS REFERENCE TO RELATED APPLICATIONS

This application claims the benefit of U.S. Provisional Patent Application Ser. No. 61/936,061 filed Feb. 5, 2014 which is incorporated by reference in its entirety as if set forth at length herein.

TECHNICAL FIELD

This disclosure relates generally to optical communications structures systems and methods. More particularly, this disclosure pertains to techniques, methods and apparatus for the bias control of modulators for the generation of optical qam signals.

BACKGROUND

Contemporary optical communications systems oftentimes employ advanced modulation formats. Given their importance to these contemporary optical communications systems, techniques, methods and apparatus that facilitate the generation of such modulation formats would represent a welcome addition to the art.

SUMMARY

An advance in the art is made according to an aspect of the present disclosure directed to the generation of advanced modulation formats. More particularly, the present disclosure describes bias control methods of nested Mach-Zehnder modulators for the generation of optical QAM signals while ensuring correct I/Q polarity of the generated optical QAM signal.

Briefly, one illustrative method according to the present disclosure for ensuring correct I/Q polarity of the generated optical signal involves temporarily offsetting I and Q biases from ideal transmission null bias points. More specifically, control loops for I modulator bias, Q modulator bias, and I-Q phase delay are allowed to converge and $V_\pi/2$ is added to the bias voltages applied to I and Q modulators. The phase delay bias is dithered around the above-converged value while measuring any variation in RF power. If the measured variation in RF power is 180 degrees out of phase with the bias dither, the converged bias' determined above ensures proper operation.

Another aspect of the present disclosure is directed to a method for ensuring correct modulator I/Q polarity which temporarily makes I and Q data streams identical. More specifically, this alternative method according to the present disclosure drives the modulator with statistically independent I and Q data streams such control loops for the I modulator bias, Q modulator bias, and I-Q phase delay converge. A source driving the modulator is driven such that I and Q data streams become identical. The phase delay bias is dithered around the above-converged value while measuring any variation in RF power. If the measured RF power is 180 degrees out of phase with the bias dither, then the converged bias' determined above ensures proper operation.

BRIEF DESCRIPTION OF THE DRAWING

A more complete understanding of the present disclosure may be realized by reference to the accompanying drawing in which.

DETAILED DESCRIPTION

Figure 1:
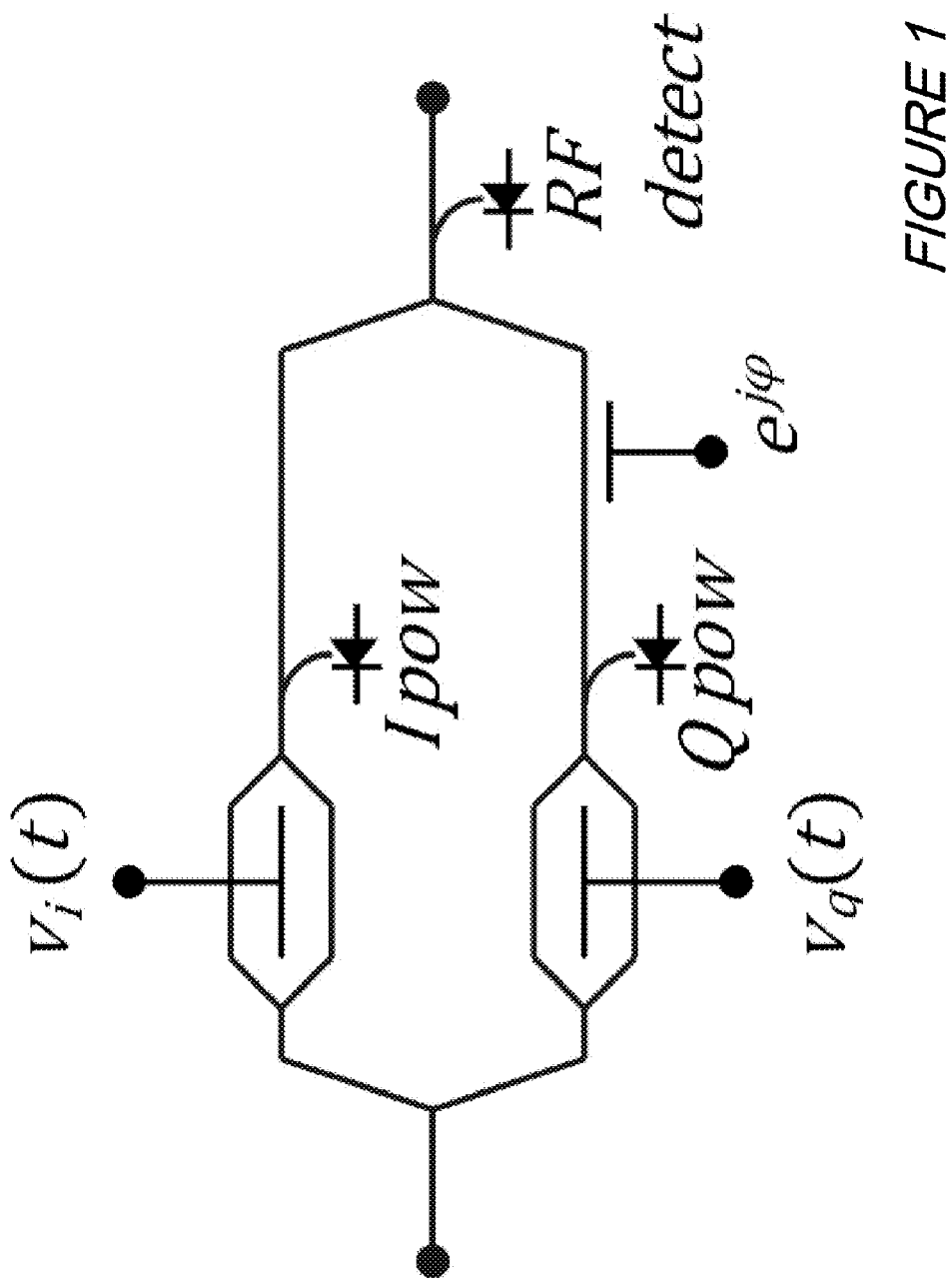
FIG. 1 shows a schematic of an illustrative nested Mach-Zehnder Interferometer (MZI)

The following merely illustrates the principles of the disclosure. It will thus be appreciated that those skilled in the art will be able to devise various arrangements which, although not explicitly described or shown herein, embody the principles of the disclosure and are included within its spirit and scope. More particularly, while numerous specific details are set forth, it is understood that embodiments of the disclosure may be practiced without these specific details and in other instances, well-known circuits, structures and techniques have not be shown in order not to obscure the understanding of this disclosure.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currentlyknown equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the disclosure.

In addition, it will be appreciated by those skilled in art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

We begin by noting that advanced modulation formats are particularly attractive for application to optical communications systems that require a high spectral efficiency (bit/s/Hz). As may be appreciated by those skilled in the art, high spectral efficiencies are traditionally required in metro, long-haul, and submarine optical communications systems where optical link cost(s) are very high and increasing spectral efficiency is seen as an effective way of reducing cost per bit. Such high optical link costs drive the use of multiple, high-performance, state-of-the-art components in transceivers used in such links.

FIG. 1 shows in schematic form a "nested" Mach-Zehnder modulator for generation of polarization multiplex QAM signals according to an aspect of the present disclosure. As will be readily observed by those skilled in the art, such a nested structure includes an "outer" or "nested" modulator having an input, an output, and two arms connecting the input to the output. Each of the arms includes an "inner" modulator positioned therein.

These inner modulators—known as the I and Q modulators—are driven by electrical signals $v_i(t)$ and $v_q(t)$, respectively.

As may be appreciated and understood by those skilled in the art, bias points of the I and Q modulators may be locked based on an average optical power at their outputs. As shown in FIG. 1, the average optical power of the I and Q modulators may be detected by photodetectors, Q pow and I pow. This power is measured as the DC component of the current flowing in the photo detector and the modulator output.

The I and Q components from the inner modulators are combined in an additional section of the modulator with the relative phase $e^{j\Phi}$ that is controlled by a phase delay bias voltage. Advantageously, this relative phase may be adjusted to a desired value based on the RF power of the current in a detector at the output of the nested modulator namely RF detect.

Figure 2:
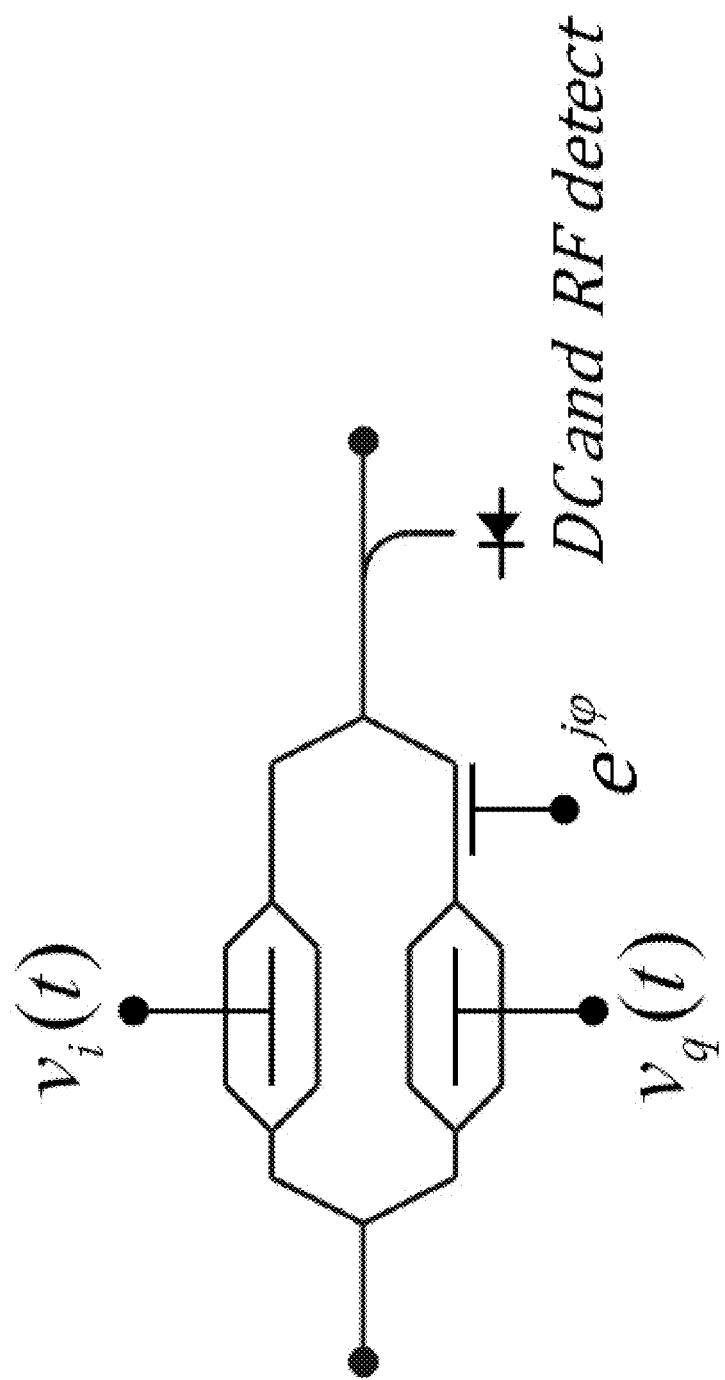
FIG. 2 shows a schematic of an alternative illustrative nested MZI.

Turning now to FIG. 2, there is shown an alternative—somewhat simpler—structure nested structure according to an aspect of the present disclosure.

As may be observed from FIG. 2, a single photodetector DC and RF detect is used for control of I and Q bias as well as I-Q phase relation. More specifically, such control is performed in a round-robin fashion by observing the detector current (DC or RF) while manipulating one bias at a time keeping the two other biases constant. In particular: i) the detector current is monitored as the I modulator bias is being manipulated while Q bias and phase delay biases are kept constant, ii) the detector current is monitored as the Q bias is being manipulated while I bias and phase delay biases are kept constant, iii) the detector current is monitored as the phase delay bias is being manipulated while I and Q biases are kept constant, repeat i), ii), iii) . . . etc.

Bias Control for the I/Q (Inner) Modulators

We can express the complex envelope at the output of the I or Q modulator in terms of the complex envelope at the input, $m_{in}$ (assumed to be 1 in the following for simplicity), and the drive signal $v_i(t)$ (or $v_q(t)$) written as $v_b + v_d(t)$ $$m_{out}(t) = m_{in}\sin\left(\frac{\pi}{2V_\pi}(v_b + v_d(t) - v_0)\right)$$

where $V_\pi$ is a characteristic voltage for the modulator that specifies how much the drive voltage must be changed to induce a 180 deg change of the relative phase of the optical fields traveling in the upper and the lower arms of the inner modulator (which varies from device to device), $v_0$ is a characteristic voltage for the modulator that specifies a drive voltage where the output is 0 and the slope of the sin( ) function is positive (varies from device to device and drifts over time and temperature), $v_b$ is the DC component of the drive signal (the bias voltage), and $v_d(t)$ is the AC component that carries the data.

Notably, if the modulator is biased with $v_b = v_0$, the output amplitude is 0 for $v_d(t) = \ldots -2V_\pi, 0, 2V_\pi \ldots$ and maximum for $v_d(t) = \ldots -V_\pi, V_\pi, 3V_\pi \ldots$. Specifically, if $v_d(t) = 1740$ where $i(t) \in \{-1, 1\}$ as an example is the I component of an optical QPSK signal we wish to generate, we find that $m_{out}(t) = i(t)$. However, if the modulator is instead biased at $v_b = v_0 + 2V_\pi$, we find that $m_{out}(t) = -i(t)$, i.e. the modulator is inverting the I component.

In general, the bias points $v_0, v_0 \pm 4V_\pi, v_0 \pm 8V_\pi \ldots$ ensure $m_{out}(t) = i(t)$ whereas the bias points $v_0 + 2V_\pi \pm 4V_\pi$, $v_0 + 2V_\pi \pm 8V_\pi \ldots$ invert the signal: $m_{out}(t) = -i(t)$. For any other bias points, the transformation from $i(t)/q(t)$ to the I/Q component of the optical signal is distorted.

Those skilled in the art will readily appreciate that one function of the bias control is to ensure that the bias voltage $v_b$ continuously tracks the $v_0$ of the modulator.

According to an aspect of the present disclosure, bias control of the I/Q modulators is based on the power at the output of the modulator according to the following relationship:

$$p_{out}(t) = |m_{out}(t)|^2 = \sin^2\left(\frac{\pi}{2V_\pi}(v_b + v_d(t) - v_0)\right)$$

Figure 3:
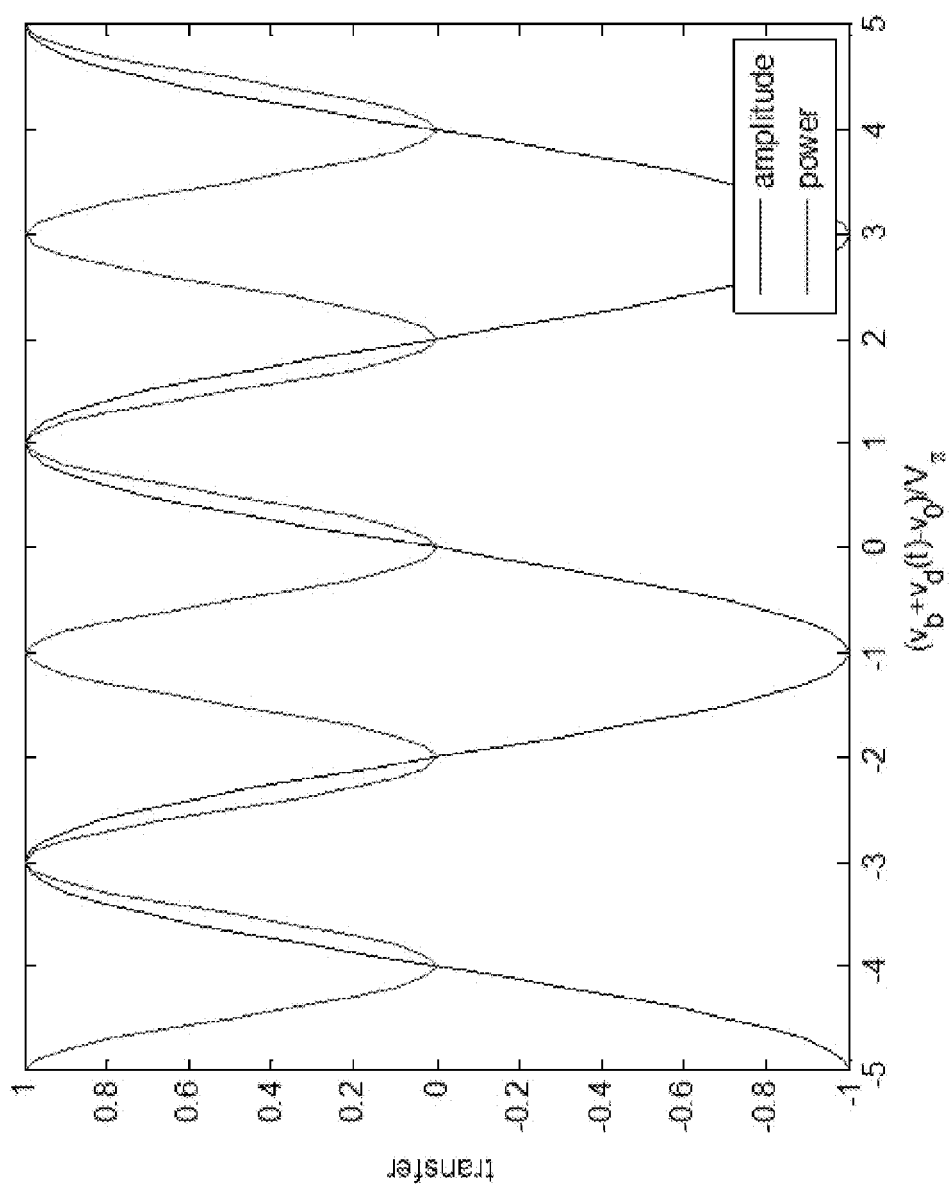
FIG. 3 is a graph depicting amplitude and power transfer as a function of the normalized drive voltage.

FIG. 3 is a graph which shows amplitude and power transfer as a function of the normalized drive voltage namely, $$\frac{v_b + v_d(t) - v_0}{V_\pi}.$$

No I/Q Data Modulation

Figure 4:
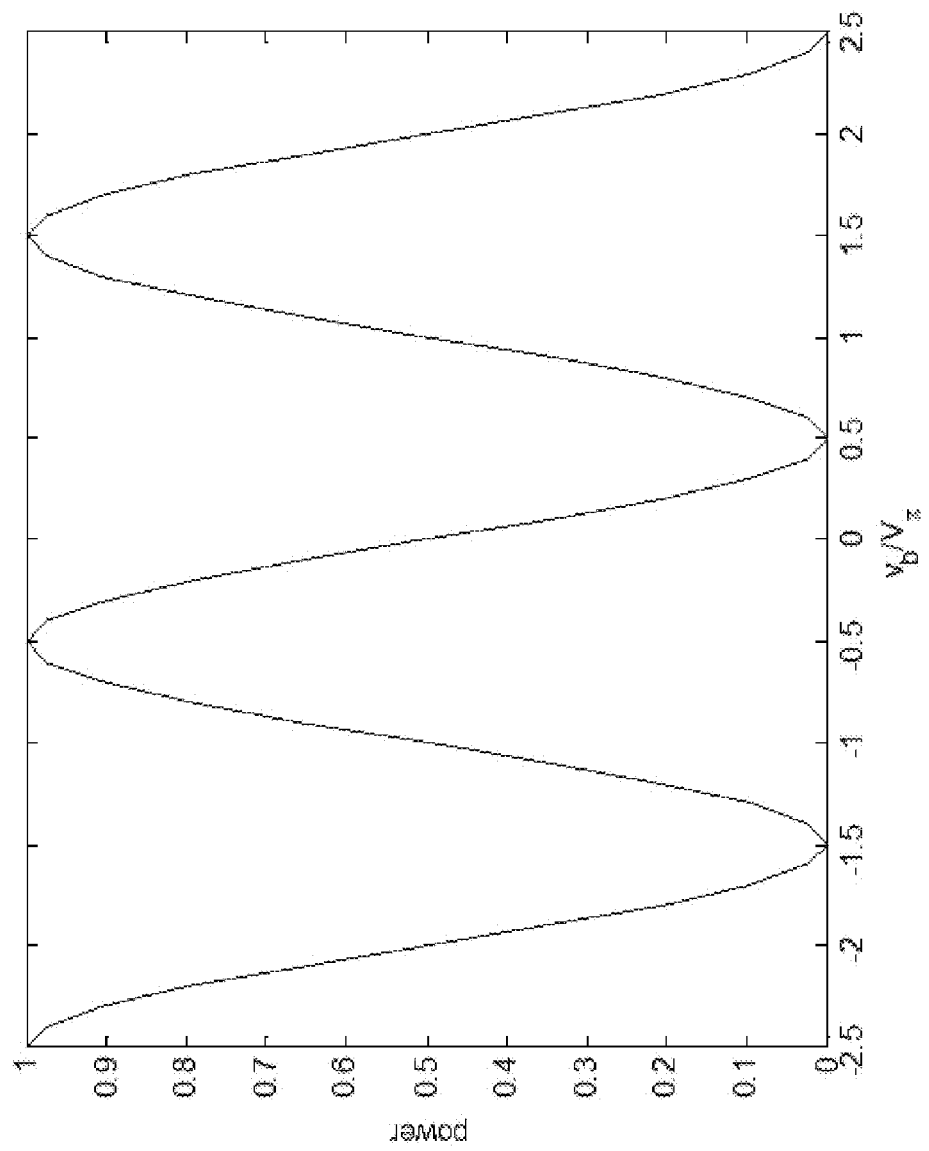
FIG. 4 is a graph depicting output power as a function of bias voltage.

In the absence of data modulation, the electrical drive signal equals the bias voltage e.g. $v_i(t)=v_b$. FIG. 4 shows the output power as a function of the bias voltage for a case where $v_0=0.5V_\pi$.

As may now be appreciated, the bias control will try to set $v_b$ to $v_0$ by minimizing the power. However, having only access to the power of the signal, the bias control will not have any preference for one power null over the other meaning that it's throughout possible that the bias point ends up at e.g. $v_b=v_0+2V_\pi$, i.e. a bias point where the optical field is inverted relative to the data.

Figure 5:
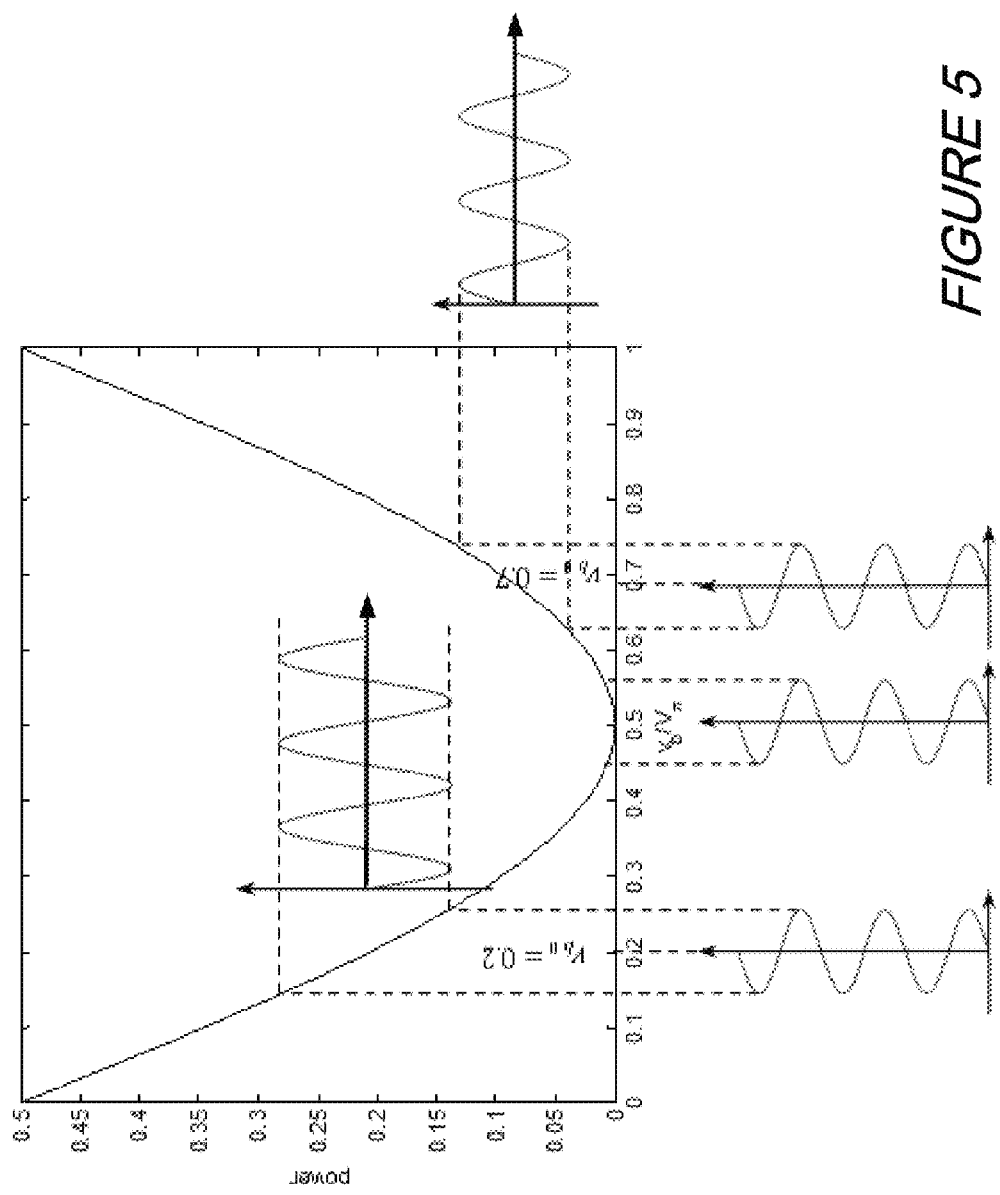
FIG. 5 is a graph depicting the change in the polarity of the dither tone in the modulator output power changing from inverted to noninverted.

To minimize the power, a small dither tone is impressed on the bias $v_b=v_{b0}+\epsilon \sin(\omega_b t)$. As illustrated in FIG. 5 below, the polarity of the $\sin(\omega_b t)$ dither tone in the modulator output power will change from inverted ($v_{b0}<v_0$) to noninverted ($v_{b0}>v_0$) because the slope of the bias-to-power transfer function is negative below the minimum and positive above. When $v_{b0}=v_0$, the dither tone will disappear in the optical power. Consequently, the sign and amplitude of the dither tone in the optical power can be used in e.g. a PID control loop to set $v_b$ to $v_0$ (or $v_b=v_0+2V_\pi$ etc).

I/Q Data Modulation Present

Figure 6:
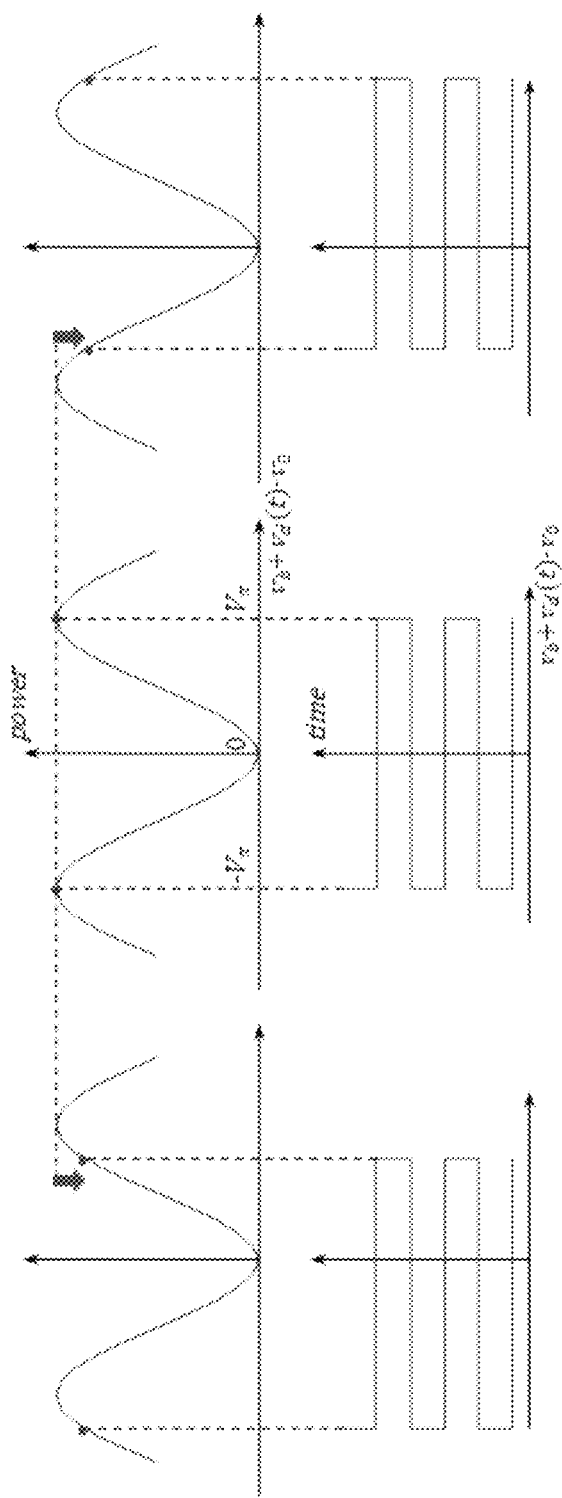
FIG. 6 is a graph showing bias voltage and drive waveform and amplitude.

As will also be appreciated by those skilled in the art, the optical power at a modulator's output will vary when the electrical drive signal is connected however, averaging the output optical power over "many" (thousands) symbols provides a good feed-back signal for the bias control. The detailed relationship between the bias voltage and the optical average power depends on the drive waveform and amplitude. If the drive amplitude is small (significantly smaller than $2V_\pi$), the average power will have a minimum at $v_b=v_0$ similar to the case without data modulation. However, for a "reasonably ideal" waveform and a drive amplitude around $2V_\pi$, it can be seen from FIG. 6 that the average power will have a maximum at $v_b=v_0$.

Figure 7:
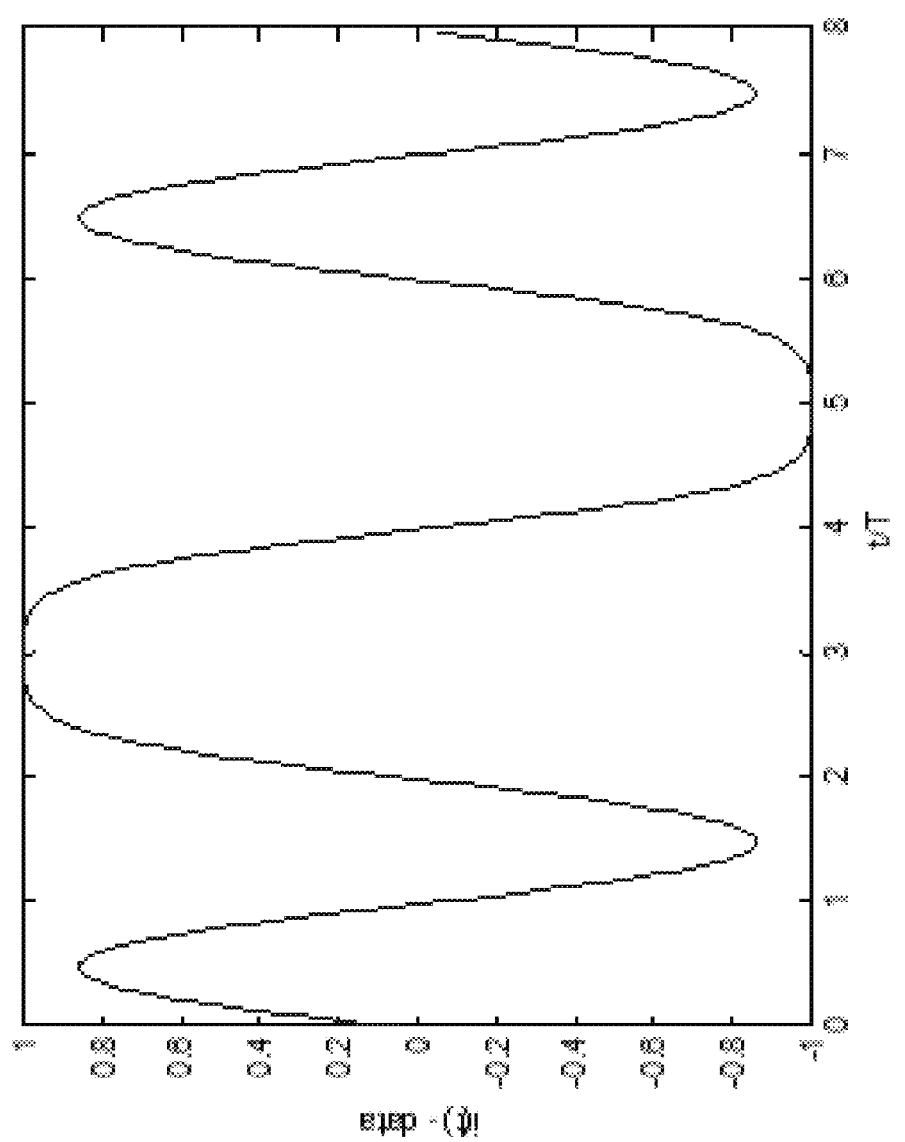
FIG. 7 is a graph showing an illustrative data signal.
Figure 8:
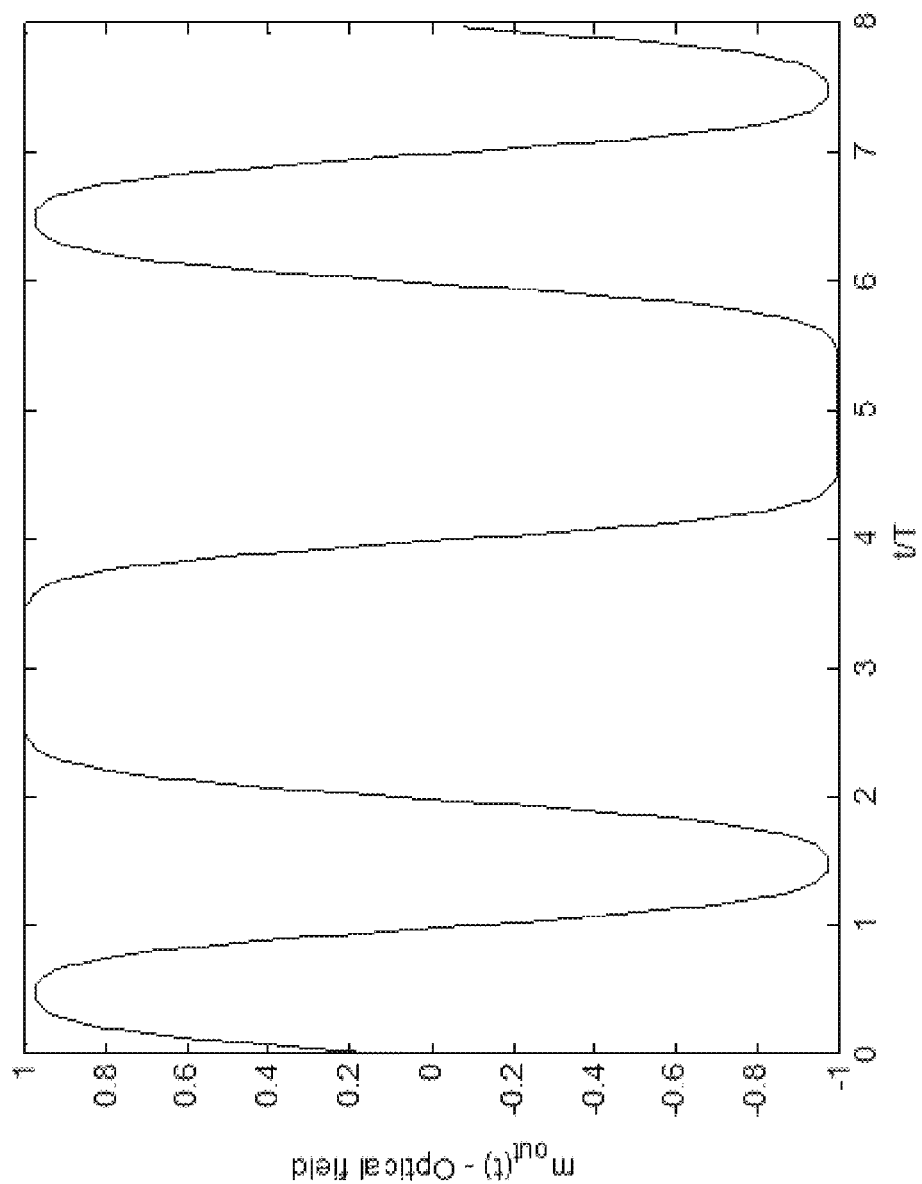
FIG. 8 is a graph showing optical field and power at a modulator output.
Figure 9:
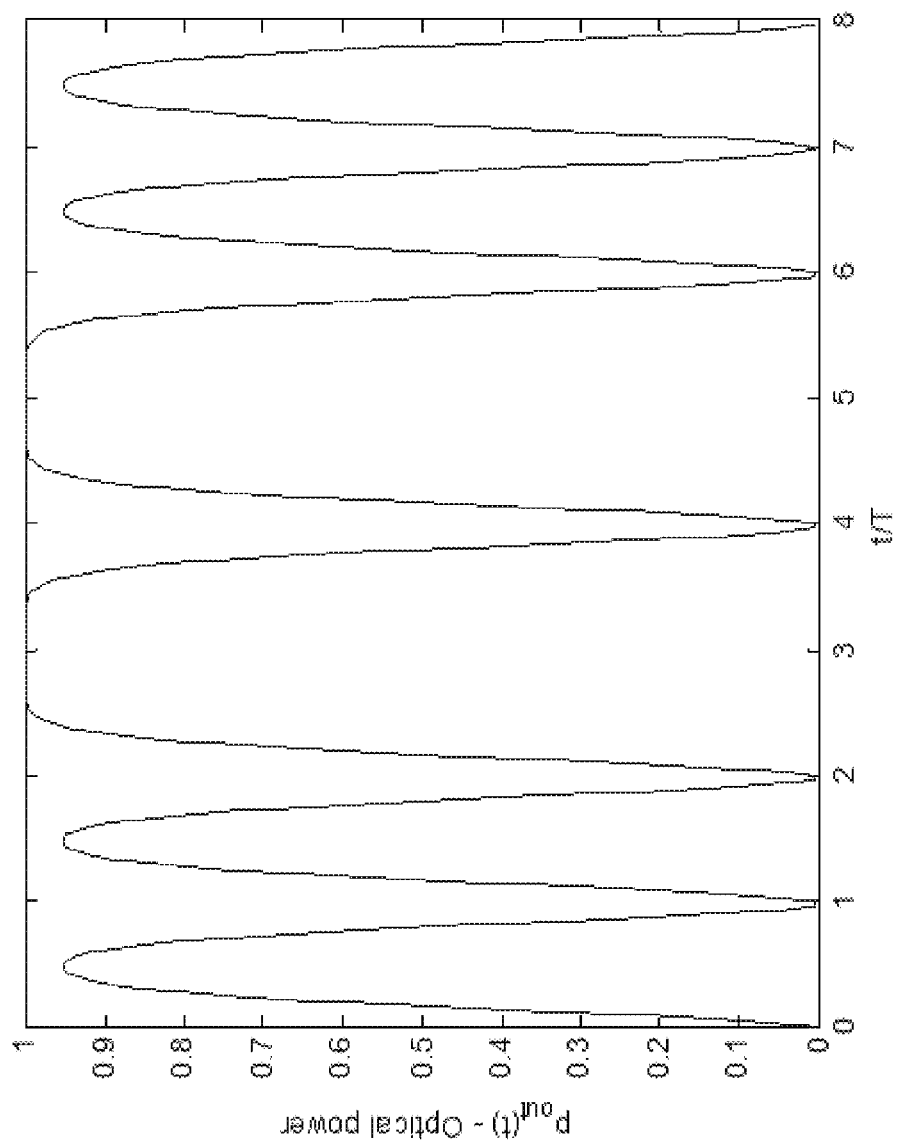
FIG. 9 is a graph showing optical field and power at a modulator output.

As an example, consider the data signal i(t) shown in FIG. 7. With a drive signal peak-peak amplitude of $2V_\pi$ ($v_d(t)=V_\pi i(t)$) and "ideal" biasing $v_b=v_0$, we have an optical field and power at the modulator's output such as that shown in FIG. 8 and FIG. 9.

Figure 10:
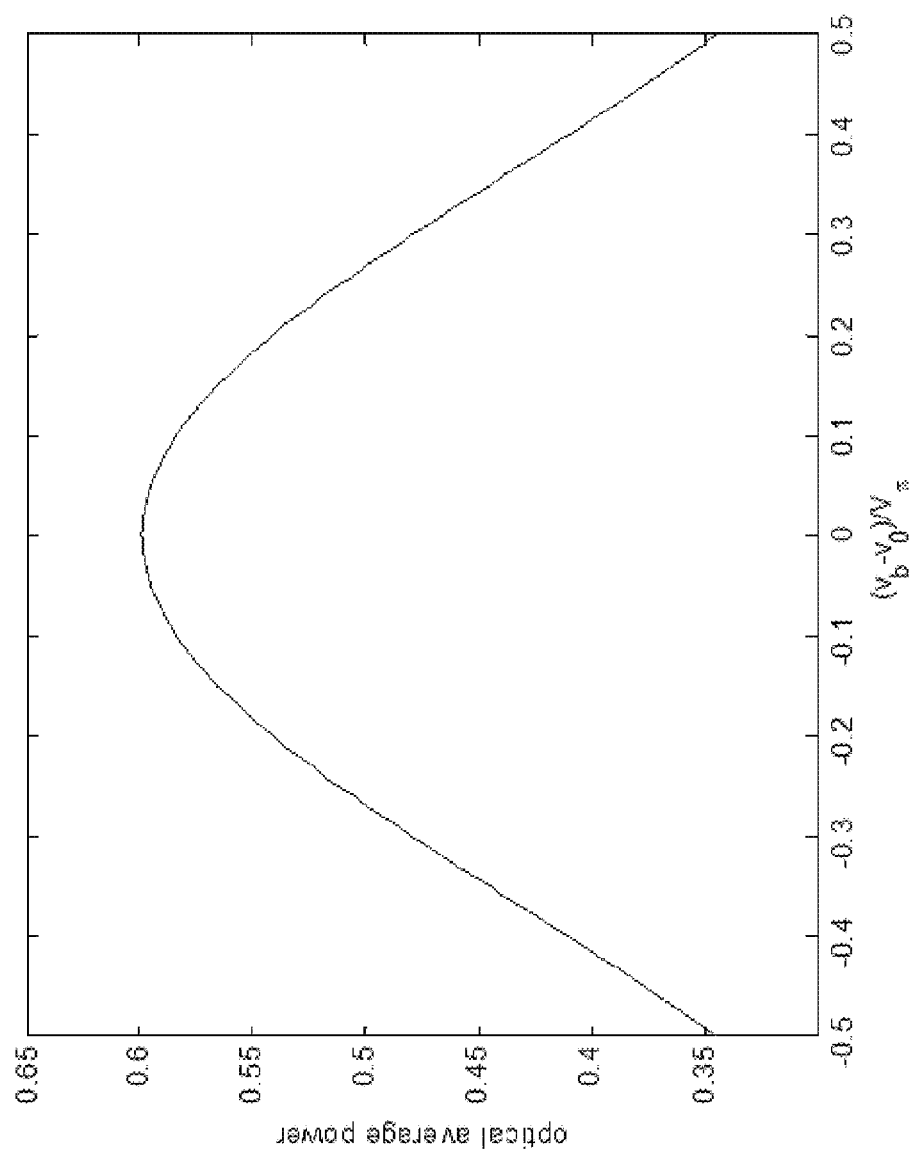
FIG. 10 is a graph showing optical power for ideal biasing.

The average optical power for this ideal biasing $v_b=v_0$ as well as for biasing offset from the ideal setting are shown in FIG. 10. As may be readily understood, the average power is maximum at the ideal biasing $v_b=v_0$. If we dither the bias and look for the dither tone in the modulator output power, the polarity of the $\sin(\omega_b t)$ dither tone in the modulator output power will change from noninverted ($v_{b0}<v_0$) to inverted ($v_{b0}>v_0$) because the slope of the bias-to-power transfer function is positive below the minimum and negative above. Notably, this behavior is the opposite of the case without data modulation—which has to be taken into account by an appropriate sign change in the bias control algorithm.

Control of the Relative Phase of I and Q Components

Figure 11:
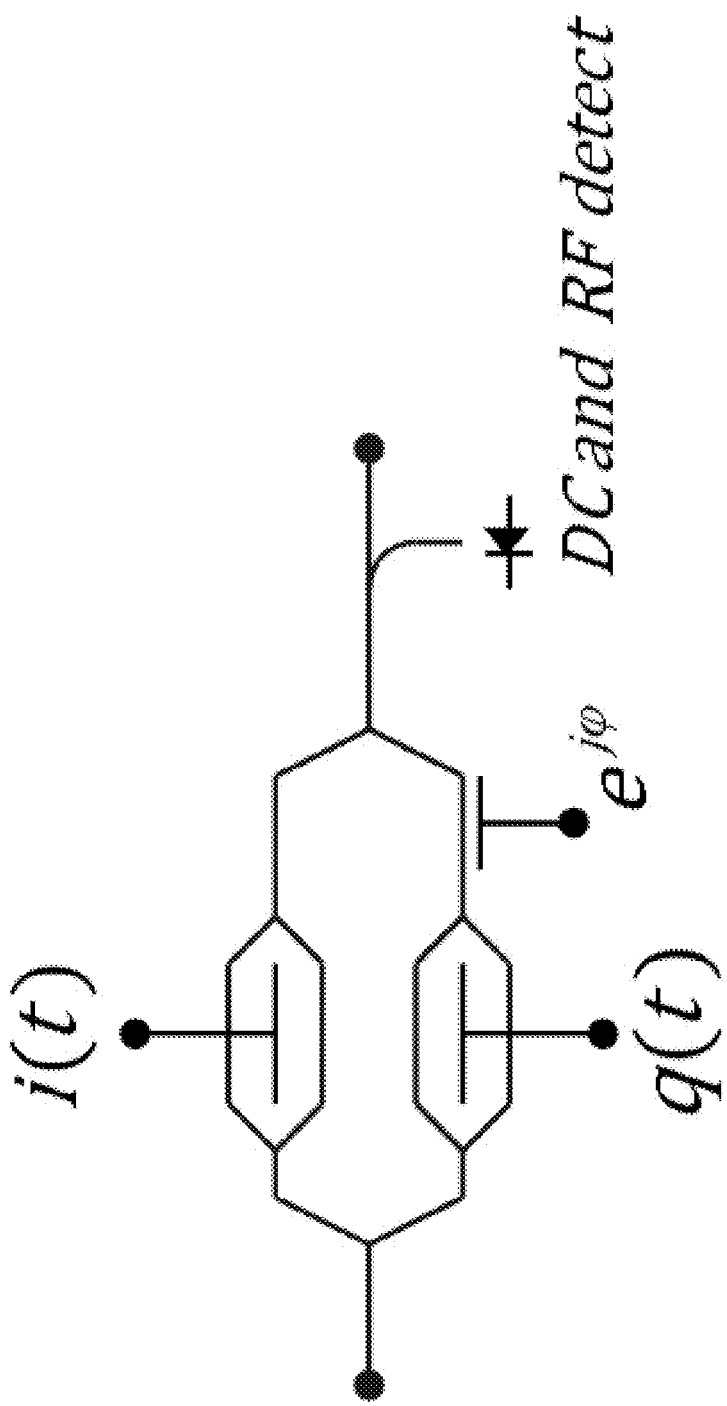
FIG. 11 shows a shows a schematic of an illustrative nested MZI.

With reference now to FIG. 11 which depicts in schematic form a nested Mach-Zehnder modulator, we now let i(t) and q(t) denote the complex envelope of the optical field at the output of the inner, I and Q modulators shown in that figure. As may be appreciated, i(t) and q(t) are encoded with statistically independent bit sequences and it is assumed that the drive signals to the I and the Q modulators are symmetrical around the 0 level so that $E\{i(t)\}=E\{i^3(t)\}=E\{q(t)\}=E\{q^3(t)\}=0$ when the modulators are biased at a transmission null.

As may be understood by those skilled in the art with reference to FIG. 11, it may be observed that there exists a phase shifting portion or section of the modulator situated after the inner Q modulator. This phase shifting section after the Q modulator delays the phase of the Q component by an amount φ controlled by the phase delay bias voltage so total complex envelope at the output of the "nested" Mach-Zehnder modulator becomes:

$$i(t)+e^{j\phi}q(t);$$

Wherein the instantaneous power of this output signal is represented by:

$$|i(t)+e^{j\phi}q(t)|^2=(i^2(t)+q^2(t)+2i(t)q(t)\cos\phi);$$

which, apart from a constant expressing the detector response (responsivity), is also the current in an ideal photo detector at the output of the nested modulator.

The RF power R of this photo current is $$R = E\{(i^2(t) + q^2(t) + 2i(t)q(t)\cos\varphi)^2\} = \\ E\{i^4(t)\} + E\{q^4(t)\} + 4E\{i^2(t)\}E\{q^2(t)\}\cos^2\varphi + \\ 2E\{i^2(t)\}E\{q^2(t)\} + 4E\{i^3(t)\}E\{q(t)\}\cos\varphi + 4E\{i(t)\}E\{q^3(t)\}\cos\varphi$$

As noted above, $E\{i(t)\}=E\{i^3(t)\}=E\{q(t)\}=E\{q^3(t)\}=0$ when the inner modulators are biased at zero transmission points. Accordingly, a relationship between RF power and the relative phase between the I and Q components may be represented by:

$$R=E\{i^4(t)\}+E\{q^4(t)\}+2E\{i^2(t)\}E\{q^2(t)\}(1+2\cos^2\phi);$$

By adjusting the bias voltage to minimize the RF power (the $\cos^2\phi$ terms vanishes), the phase delay is set to $$\frac{\pi}{2}+k\pi,$$

k integer, which, apart from uncertainty of the sign, is the desired relative phase between the I and Q components of the optical QAM signal. This minimization can be done as described in the end of the section "no I/Q data modulation" by adding a dither tone $\sin(\omega_b t)$ to the phase delay bias voltage and use the phase and amplitude of the corresponding dither tone in the RF power detector signal as a feed-back signal for the bias control loop.

Figure 12:
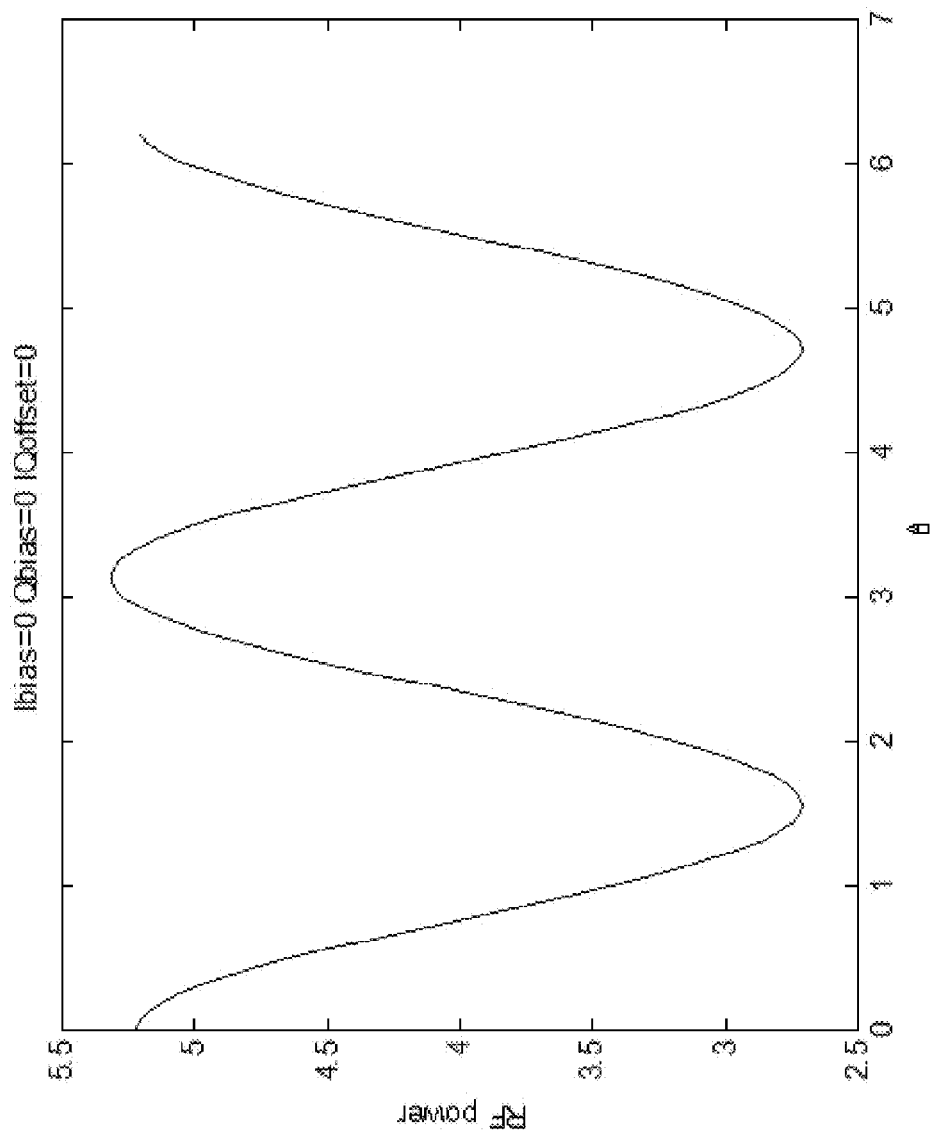
FIG. 12 is a graph showing dependency of RF power on R and the I-Q phase delay for a "realistic" I/Q drive waveform.
Figure 13:
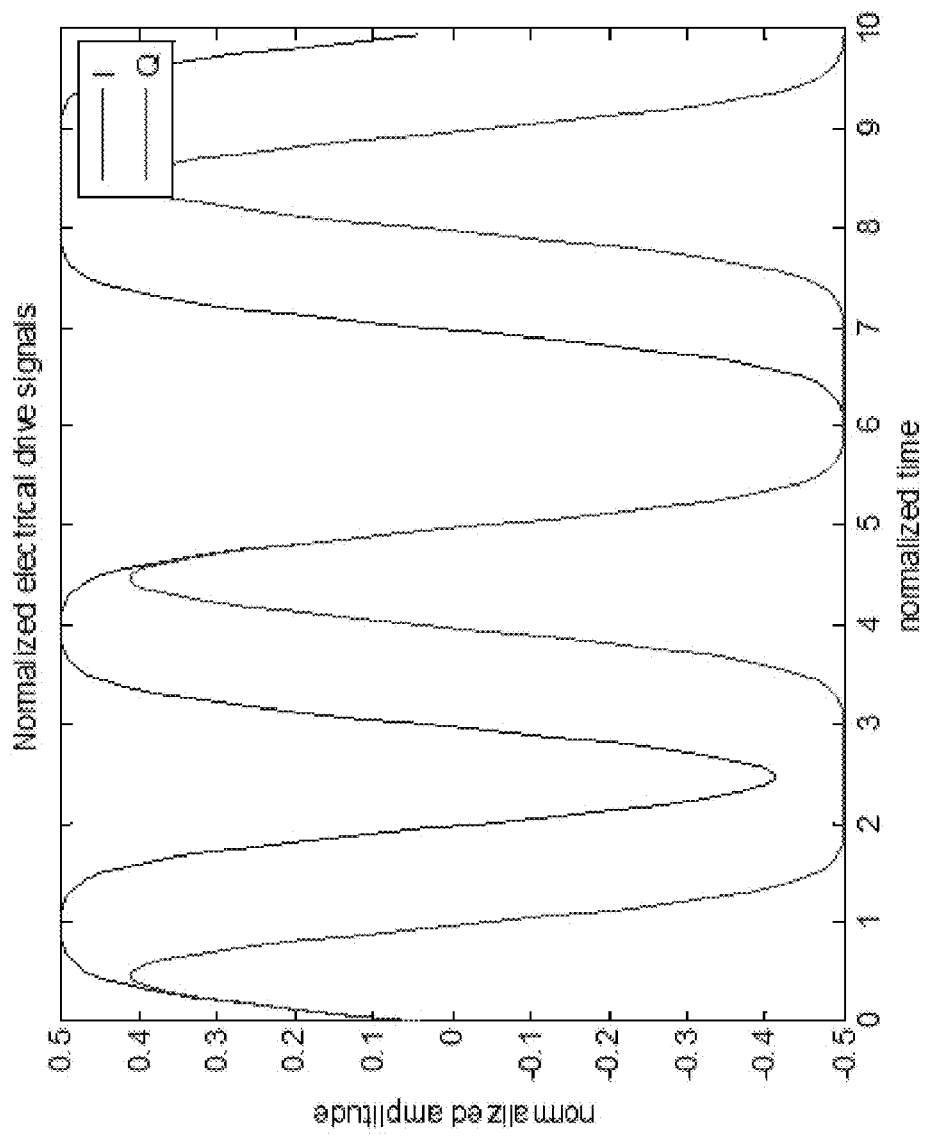
FIG. 13 is a graph showing normalized amplitude with respect to normalized electrical drive signals and time.
Figure 14:
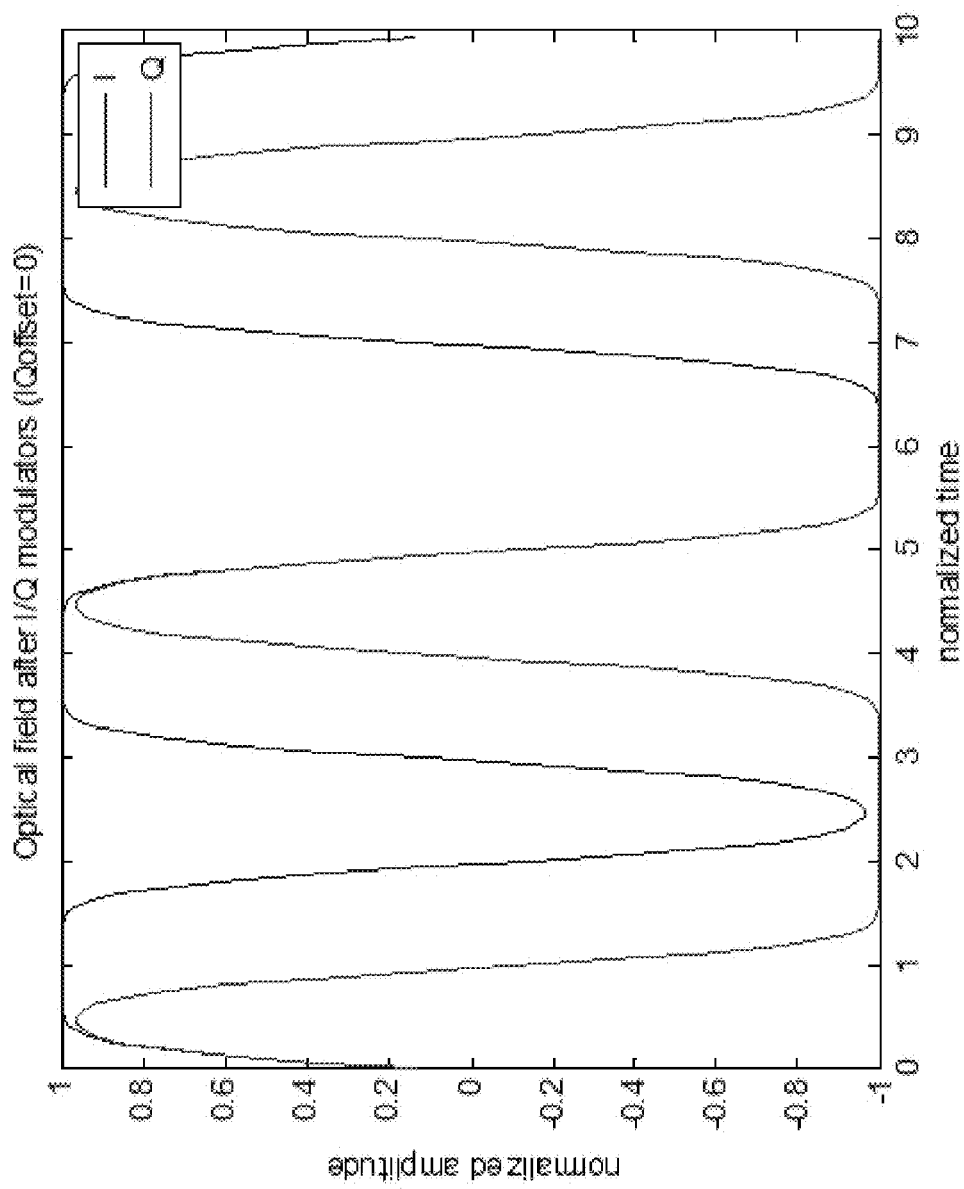
FIG. 14 is a graph showing normalized amplitude with respect to optical field after I/Q modulators and normalized time.

An example of the dependency of the RF power R on the I-Q phase delay φ is shown in FIG. 12 for a case with "realistic" I/Q drive waveforms and a peak-peak drive amplitude of $2V_\pi$ and I/Q modulators biased at $v_b-v_0, =0$ (the first 10 bits of the electrical drive waveforms and the corresponding complex envelopes at the output of the I and Q modulators are shown in FIG. 13 and FIG. 14 below).

Control of I/Q Polarity

If the inner modulators are both noninverting i.e. biased so that the I and Q components of the optical field have the same polarity as the respective drive signals ($v_b-v_0=0$, $\pm 4V_\pi, \pm 8V_\pi \ldots$) and the I-Q phase delay is $$\varphi = \frac{\pi}{2} + k2\pi,$$

k integer, demodulation of the optical QAM signal is straightforward. The same is the case if both inner modulators invert ($v_b - v_0 = 2V_\pi$, $2V_\pi \pm 4V_\pi$, $2V_\pi \pm 8_\pi$ ...) and $$\varphi = \frac{\pi}{2} + k2\pi$$

(corresponding to a fixed 180 deg phase rotation of the QAM signal) or if one of the inner modulators invert and the other doesn't and $$\varphi = 3\frac{\pi}{2} + k2\pi.$$

For other conditions, either the I or the Q component of the optical QAM signal at the output of the modulator is inverted relative to the drive signal and the optical QAM signal cannot be demodulated correctly without special processing at the receiver. Two methods for detecting possible I/Q inversion in the modulator may not be described.
Method 1—Temporarily Offsetting I and Q Biases from Ideal Transmission Null Bias Points.

Figure 15:
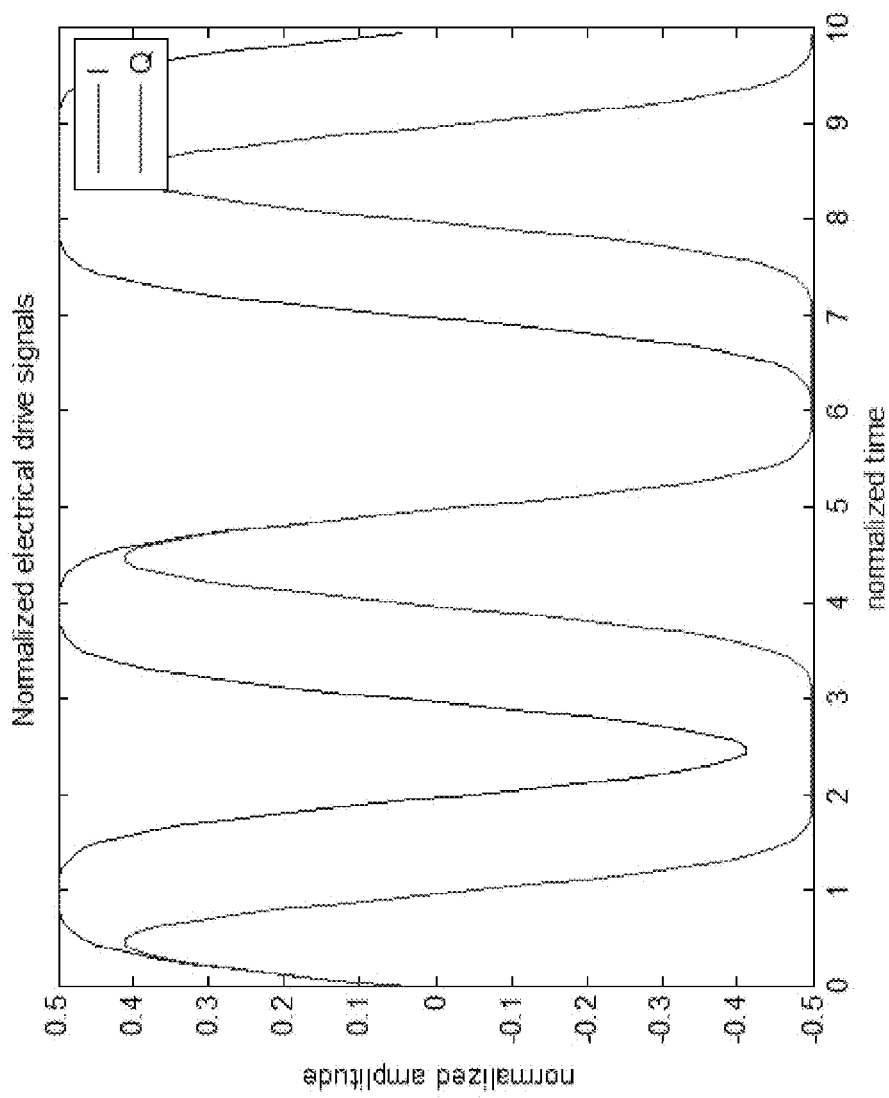
FIG. 15 is a graph showing normalized amplitude with respect to normalized electrical drive signals and time.
Figure 16:
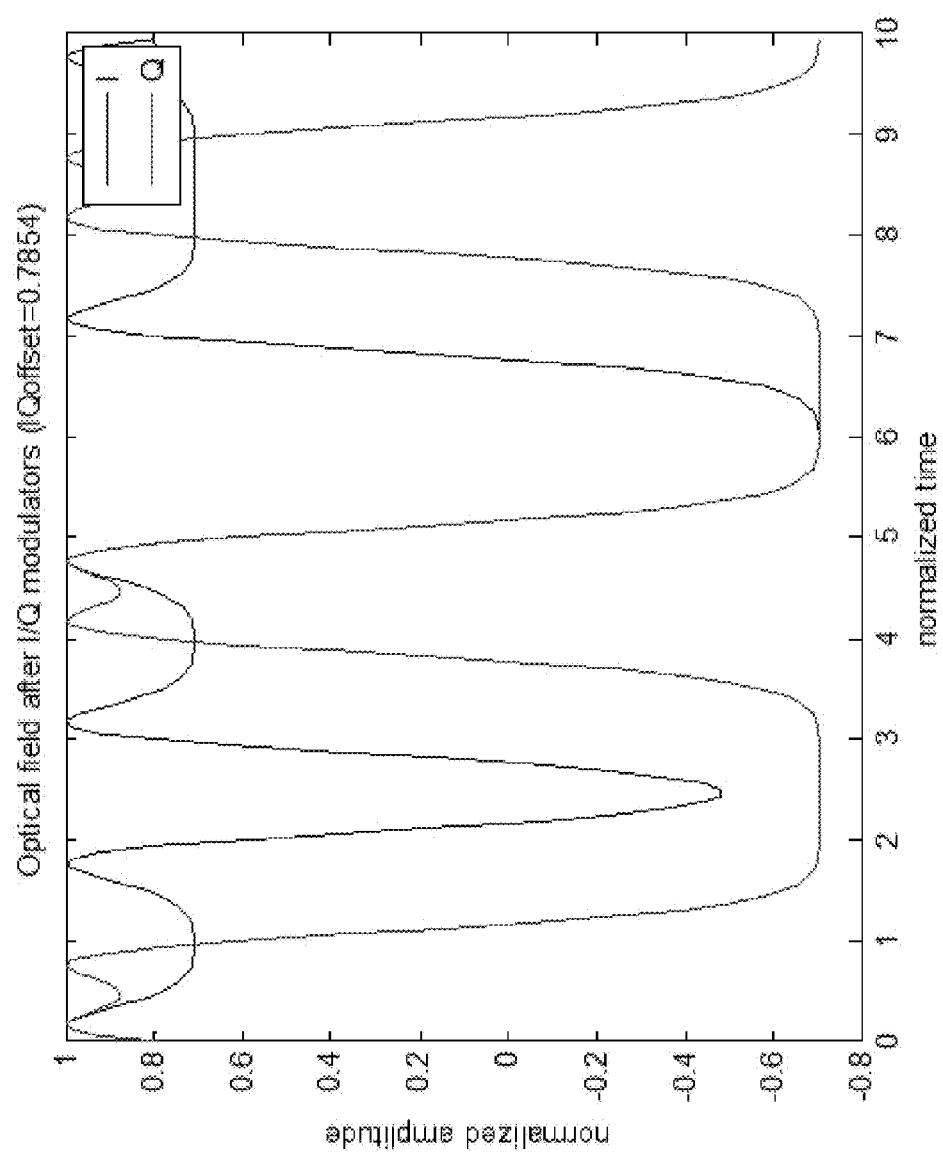
FIG. 16 is a graph showing normalized amplitude with respect to optical field after I/Q modulators and normalized time.

In this method, we assume that all three bias control loops have converged such that the I and the Q modulators are biased at a transmission null and the RF power is minimized i.e.

$$\varphi = \frac{\pi}{2} + k\pi,$$

where k is an integer. Now, if the bias voltage for the I modulator is increased by a "small" offset relative to the transmission null, $E\{i(t)\}$ and $E\{i^3(t)\}$ will become positive if the slope of the optical field vs drive voltage transfer curve at the transmission null is positive corresponding to noninverting operation. This is illustrated in FIG. 15 and FIG. 16 for a bias voltage increase of $V_\pi/2$ (compare to the FIG. 13 and FIG. 14).

Similarly, if the slope of the transfer curve is negative at the transmission null (inverting operation), $E\{i(t)\}$ and $E\{i^3(t)\}$ will become negative. The same holds for the Q modulator. This means that the terms $E\{i^3(t)\}E\{q(t)\}$ and $E\{i(t)\}E\{q^3(t)\}$ in the expression for the RF power will become positive when the I and Q bias voltages are increased if both the I modulator and the Q modulator are noninverting or if both modulators are inverting. However, if one modulator is inverting and the other is noninverting, the two terms will become negative.

As may be appreciated by those skilled in the art, the sign of the terms $E\{i^3(t)\}E\{q(t)\}$ and $E\{i(t)\}E\{q^3(t)\}$ influences the derivative of the RF power R with respect to the I-Q phase delay $\phi$. If we look at this derivative near the phase delay found by minimizing the RF power (before adding the offset to the I and Q modulator biases) i.e.

$$\varphi \approx \frac{\pi}{2} + k\pi,$$

we find that $$\frac{dR}{d\varphi} = -8E\{i^2(t)\}E\{q^2(t)\}\cos\varphi\sin\varphi - 4(E\{i^3(t)\}E\{q(t)\} + E\{i(t)\}E\{q^3(t)\})\sin\varphi \approx$$
$$-4(E\{i^3(t)\}E\{q(t)\} + E\{i(t)\}E\{q^3(t)\})\sin\varphi$$

Figure 17:
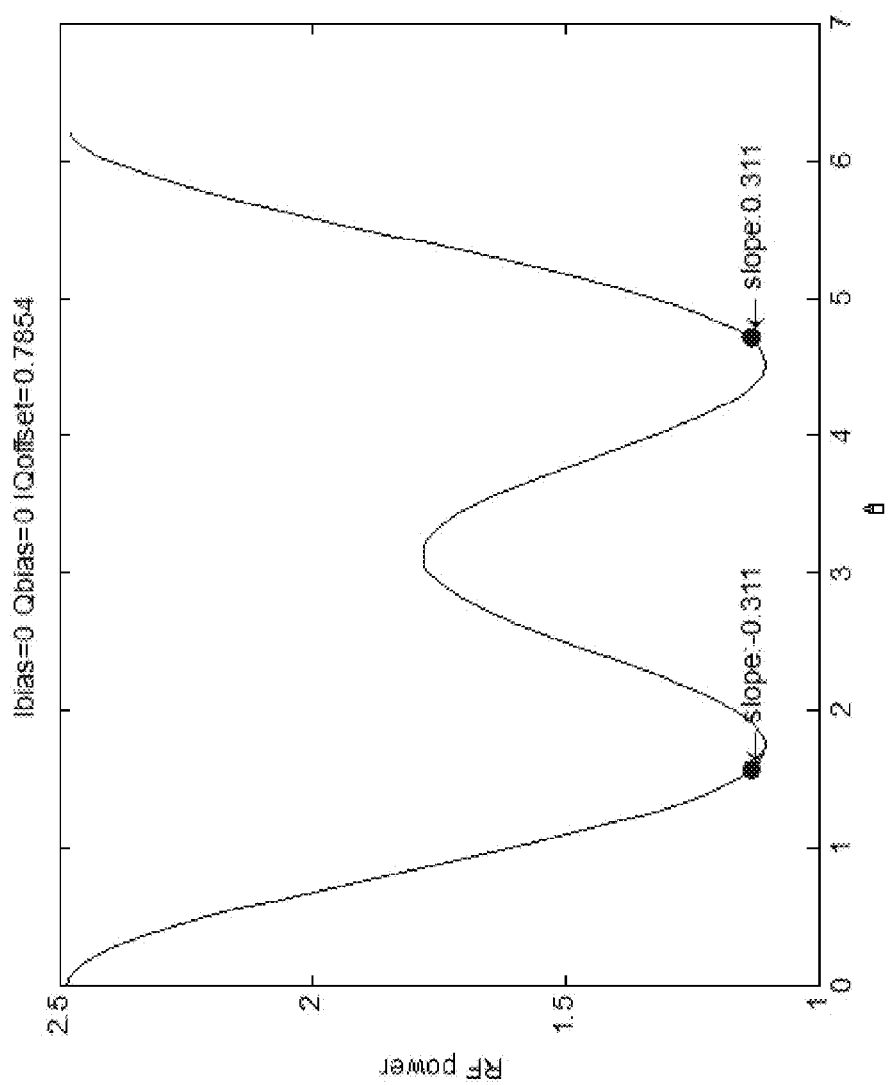
FIG. 17 is a graph showing relative change of RF power with respect to phase delay for a case where both modulators are noninverting.

In the cases where both modulators are noninverting or both are inverting, adding a "small" positive offset to the I and Q modulator biases makes the parenthesis ($E\{i^3(t)\}E\{q(t)\} + E\{i(t)\}E\{q^3(t)\}$) positive and the slope of the derivative of the RF power with respect to $\phi$ will have the opposite sign of $\sin\varphi$). In these cases, the desired optical field is generated when $$\varphi \approx \frac{\pi}{2} + k2\pi,$$

k integer, as discussed above, showing that the desired operation of the modulator is characterized by the RF power being a decreasing function of the phase delay $\phi$. This is illustrated in FIG. 17 for the case where both modulators are noninverting. The graph shows the relative change of RF power with respect to $\phi$ in radians i.e.

$$\frac{1}{R}\frac{dR}{d\varphi}$$

for the drive waveforms and amplitude considered above.

Figure 18:
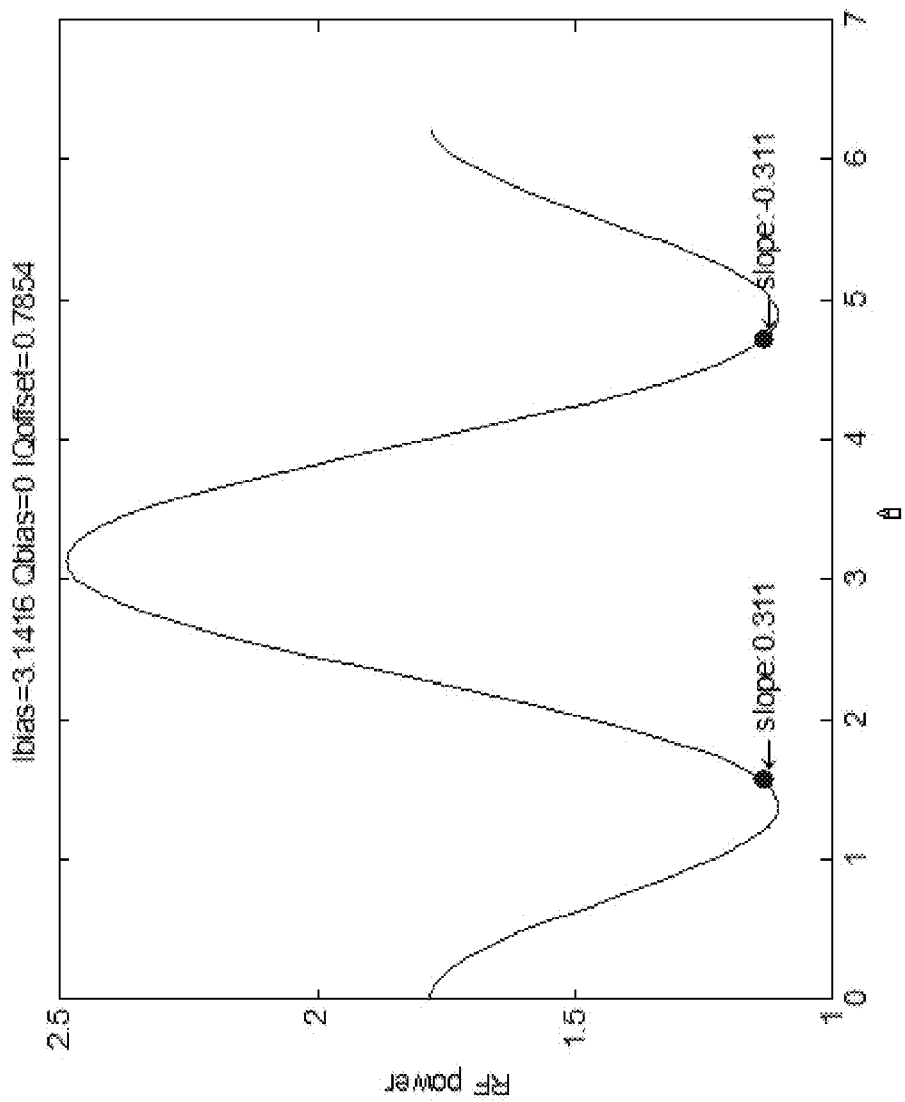
FIG. 18 is a graph showing relative change of RF power with respect to phase delay for a case where one of the modulators is noninverting and the other is inverting.

If, on the other hand, we consider the cases where one of the two modulators is inverting and the other is noninverting, the parenthesis ($E\{i^3(t)\}E\{q(t)\} + E\{i(t)\}E\{q^3(t)\}$) becomes negative when a "small" positive offset is added to the I and Q modulator biases so that the derivative of the RF power with respect to $\phi$ will have the same sign as $\sin\phi$. In these cases, the desired optical field is generated when $$\varphi \approx \frac{3\pi}{2} + k2\pi,$$

k integer, showing again that the desired operation of the modulator is characterized by the RF power being a decreasing function of the phase delay $\phi$. FIG. 18 illustrates the situation where the I modulator is inverting and the Q modulator is noninverting.

This leads to the following method according to the present disclosure that ensures correct I/Q polarity of a generated optical QAM signal:
1. Let the control loops for I bias, Q bias, and I-Q phase delay converge.
2. Freeze the I and Q bias control loops and add e.g. $V_\pi/2$ to the bias voltages for the I and Q modulators
3. Open the phase delay loop and dither the phase delay bias (and consequently $\phi$) around the value determined in step 1 and look for the corresponding variation of the RF power.
4. If the variation of the RF power is 180 deg out of phase with the impressed bias dither, the slope of the RF power vs bias voltage curve is negative and the bias points determined in step 1. Ensure the desired modulator operation. Set all bias points to the values found in step 1.

5. However, if the variation of the RF power is in-phase with the impressed bias dither, the slope of the RF power vs bias voltage curve is positive and the bias points determined in step 1 causes inversion of the I or Q component of the optical field relative to the drive signals. To correct this I/Q inversion one of the following actions can be taken: i) increase/decrease the I modulator bias by $2V_\pi$ compared to the value found in step 1, and set the Q modulator bias to the value found in step 1, ii) increase/decrease the Q modulator bias by $2V_\pi$ relative to the value found in step 1 and set the I modulator bias to the value found in step 1, or iii) increase/decrease the I-Q phase delay bias by $V_\pi$ and set the I and Q modulator biases to the values found in step 1, or iv) invert either the I or the Q data driving the modulator and set the I and Q biases to the values found in step 1.

6. Close and unfreeze all three control loops to enable continuous tracking of the correct bias points.

Instead of detecting the phase relation between the dither tone impressed on the phase delay bias and the resulting dither tone in the RF power, we can modify step 3. and keep the phase delay control loop closed while we observe the direction in which the loop drives the phase delay bias when the "small" offset is added to the I and Q biases. Since the phase delay loop attempts to minimize the RF power, it will increase the bias voltage if the derivative of the RF power with respect to the phase delay bias is negative (negative slope slightly below of the point of minimum RF power), and it will decrease the bias voltage if the derivative is positive (positive slope slightly above the point of minimum RF power). This means that the negative slope condition in step 4. is detected if the phase delay loop increases the phase delay bias in response to adding "small" positive offsets to the I and Q biases. The condition is step 5. is detected if the phase delay loop decreases the phase bias.

As an alternative to monitoring at the RF power of the detector current when we add "small" offsets to the I and Q modulator biases, we can monitor the DC component which is proportional to the optical average power expressed by:

$$E\{|i(t)+e^{j\phi}q(t)|^2\}=E\{i^2(t)\}+E\{q^2(t)\}+2E\{i(t)\}E\{q(t)\}\cos\phi.$$

The derivative of the DC component with respect to the phase delay I $$-2E\{i(t)\}E\{q(t)\}\sin\phi.$$

This quantity has the same sign properties as the derivative of the RF power, $$\frac{dR}{d\varphi},$$

and can be used for determination of possible I/Q inversion.

Method 2—Temporarily Make I and Q Data Streams Identical.

If we program a data source driving the modulator to output identical bit sequences, we get i(t)=q(t) if both modulators are noninverting or both modulators are inverting. In these cases the instantaneous power of the modulator output signal is defined by:

$$|i(t)+e^{j\phi}q(t)|^2=i^2(t)|1+e^{j\phi}|^2=2i^2(t)(1+\cos(\phi))$$

and the RF component of the photo current will be proportional to $$4E\{i^4(t)\}(1+\cos(\phi))^2$$

so that the derivative of the RF power with respect to the I-Q phase difference $\phi$ equals $$-8E\{i^4(t)\}(1+\cos(\phi))\sin(\phi)$$

which is negative for $$\varphi = \frac{\pi}{2} + k2\pi$$

corresponding to the correct I/Q polarity and positive for $$\varphi = \frac{3\pi}{2} + k2\pi$$

corresponding to incorrect I/Q polarity.

In the case that one of the modulators invert and the other doesn't i(t)=−q(t) and the RF component of the photo current becomes $$4E\{i^4(t)\}(1-\cos(\phi))^2$$

with the following derivative of the RF power with respect to the I-Q phase delay $$+8E\{i^4(t)\}(1-\cos(\phi))\sin(\phi)$$

This expression is negative for $$\varphi = \frac{3\pi}{2} + k2\pi$$

corresponding to the correct I/Q polarity and positive for $$\varphi = \frac{\pi}{2} + k2\pi$$

corresponding to incorrect I/Q polarity.

Thus, it is found that correct I/Q polarity is characterized by a negative derivative of the RF power with respect to the I-Q phase delay $\phi$ when the I and Q data streams are identical. To detect the slope of the RF power vs phase delay bias curve, we can open the phase delay bias loop and compare the phase of a dither tone impressed on the phase bias and the resulting dither tone in the RF power as discussed above (negative slope means that the two dither tones are 180 deg out of phase). This leads to the following method for ensuring correct I/Q polarity:

1. Driving the modulator with statistically independent I and Q data streams, let the control loops for I bias, Q bias, and I-Q phase delay converge;
2. Program the source driving the modulator so the I and Q data streams become identical. Optionally freeze the I and Q biases.
3. Open the phase delay loop and dither the phase delay bias (and consequently $\phi$) around the value determined in step 1 and look for the corresponding variation of the RF power.
4. If the variation of the RF power is 180 deg out of phase with the impressed bias dither, the slope of the RF power vs bias voltage curve is negative and the bias points determined in step 1. ensures the desired modulator operation.

5. However, if the variation of the RF power is in-phase with the impressed bias dither, the slope of the RF power vs bias voltage curve is positive and the bias points determined in step 1 causes inversion of the I or Q component of the optical field relative to drive signals. To correct this I/Q inversion one of the following actions can be taken: i) increase/decrease the I modulator bias by $2V_\pi$ to the value found in step 1, and set the Q modulator bias to the value found in step 1, ii) increase/decrease the Q modulator bias by $2V_\pi$ relative to the value found in step 1 and set the I modulator bias to the value found in step 1, or iii) increase/decrease the I-Q phase delay bias by $V_\pi$ and set the I and Q modulator biases to the values found in step 1, or iv) invert either the I or the Q data driving the modulator and set the I and Q biases to the values found in step 1.

6. Revert to normal operation with statistically independent I and Q data (using the same drive signal polarity as in step 1. with the possible inversion added in step 6.) and close and unfreeze all three control loops to enable continuous tracking of the correct bias points.

Similar to the discussion for Method 1, we can determine the slope of the RF power vs phase bias curve by keeping the phase delay control loop closed while we look at the direction in which the loop drives the phase delay bias when the source driving the modulator is programmed to output identical I and Q sequences: since the phase delay loop attempts to minimize the RF power, it will increase the bias voltage if the derivative of the RF power with respect to the phase delay bias is negative (negative slope slightly below of the point of minimum RF power), and it will decrease the bias voltage if the derivative is positive (positive slope slightly above the point of minimum RF power). This means that the negative slope condition in step 4. is detected if the phase delay loop increases the phase delay bias in response to identical I and Q data streams. The condition is step 5. is detected if the phase delay loop decreases the phase bias.

As an alternative to looking at the RF power of the detector current, we can look at its DC component which is proportional to the optical average power $$E\{i^2(t)\}(1 \pm \cos(\phi))$$

and its derivative with respect to the phase delay $\phi$ $$\mp 2E\{i^2(t)\}\sin(\phi)$$

Notably, this quantity has the same sign properties as the derivative of the RF power and can be used for determination of possible I/Q inversion.

At this point, those skilled in the art will readily appreciate that while the methods, techniques and structures according to the present disclosure have been described with respect to particular implementations and/or embodiments, those skilled in the art will recognize that the disclosure is not so limited. More specifically and as generally described, alternative modulator structures than those shown may be employed with methods according to the present disclosure. Accordingly, the scope of the disclosure should only be limited by the claims appended hereto.

The invention claimed is:

1. A method for bias control of a nested Mach Zehnder optical modulator, the method comprising:
    converging a control loop for biasing an I modulator of the nested Mach Zehnder optical modulator by applying a first value of a first bias voltage to the I modulator such that an output of the nested Mach Zehnder optical modulator is at transmission null;
    converging a control loop for biasing a Q modulator of the nested Mach Zehnder optical modulator by applying a first value of a second bias voltage to the Q modulator such that an output of the nested Mach Zehnder optical modulator is at transmission null; and
    converging a control loop for I-Q phase delay of the nested Mach Zehnder optical modulator by applying a phase delay bias voltage such that an output of the nested Mach Zehnder optical modulator is at transmission null;
    subsequent to converging the control loops for biasing the I and Q modulators and I-Q phase delay, offsetting the first bias voltage from the first value of the first bias voltage and the second bias voltage from the first value of the second bias voltage; and
    dithering the phase delay bias voltage while measuring variation in a characteristic of the output of the nested Mach Zehnder optical modulator.

2. The method of claim 1, wherein converging a control loop for biasing an I modulator of the nested Mach Zehnder optical modulator comprises dithering the first bias voltage around the first value of the first bias voltage and adjusting the first value of the first bias voltage until a dither tone in the output of the nested Mach Zehnder optical modulator is at a local minimum.

3. The method of claim 1, further comprising determining an I-Q polarity based at least in part on whether the measured variation in the characteristic of the output of the nested Mach Zehnder optical modulator is 180 degrees out of phase with the phase delay bias voltage dither.

4. The method of claim 3, further comprising in response to determining the I-Q polarity, selectively adjusting the first bias voltage, the second bias voltage, or the third bias voltage.

5. The method of claim 3, further comprising receiving at the I modulator and the Q modulator electric input data streams and in response to determining the I-Q polarity, selectively inverting the electric input data stream received at either the I modulator or the Q modulator during operation of the nested Mach Zehnder optical modulator.

6. The method of claim 1, wherein the characteristic of the output of the nested Mach Zehnder optical modulator is RF power of a photocurrent representing the output of the nested Mach Zehnder optical modulator.

7. The method of claim 1, wherein the characteristic of the output of the nested Mach Zehnder optical modulator is a DC component of a photocurrent representing the output of the nested Mach Zehnder optical modulator.

8. The method of claim 1, wherein converging a control loop for biasing an I modulator of the Mach Zehnder optical modulator comprises dithering the first bias voltage around the first value of the first bias voltage and adjusting the first value of the first bias voltage until a DC component of a photocurrent measured by a photodetector is at a local minimum, wherein the photodetector is configured to detect the output of the nested Mach Zehnder optical modulator.

9. A method for bias control of a nested Mach Zehnder optical modulator comprising a first modulator arm, a second modulator arm, a phase delay unit in the second modulator arm, and a photodetector configured to detect an output optical signal of the nested Mach Zehnder optical modulator, the method comprising:
    biasing the first modulator arm with a first value of a first bias point such that an output optical signal of a first type is at transmission null;

biasing the second modulator arm with a first value of a second bias point such that an output optical signal of a second type is at transmission null;

biasing the phase delay unit with a third bias point such that an output optical signal of the photodetector is at transmission null;

driving the first modulator arm and the second modulator arm with a same electric input data stream; and subsequent to biasing the phase delay unit such that the output optical signal of the photodetector is at transmission null, dithering the third bias point and monitoring a characteristic of photocurrent generated by the photodetector.

10. The method of claim 9, wherein biasing the phase delay unit with a third bias point such that an output optical signal of the photodetector is at transmission null comprises dithering the third bias point around a first value of the third bias point, and adjusting the first value of the third bias point until a dither tone in a measured photocurrent of the photodetector is at a local minimum.

11. The method of claim 9, further comprising determining an I-Q polarity based at least in part on whether the monitored characteristic of the photocurrent generated by the photodetector is 180 degrees out of phase with the third bias point dither.

12. The method of claim 11, further comprising in response to determining the I-Q polarity, selectively adjusting the first bias point, the second bias point, or the third bias point.

13. The method of claim 11, further comprising in response to determining the I-Q polarity, selectively inverting the electric input data stream applied to either the first modulator arm or second modulator arm during operation of the optical modulator.

14. The method of claim 9, wherein the characteristic of the photocurrent is RF power.

15. The method of claim 9, wherein the characteristic of the photocurrent is a DC component of the photocurrent.

16. The method of claim 9, wherein the output optical signal of the first type is the output optical signal of the nested Mach Zehnder optical modulator.

17. The method of claim 9, wherein the characteristic of the photocurrent is a DC component of the photocurrent.

18. A method for bias control of a nested Mach Zehnder optical modulator comprising a first modulator arm, a second modulator arm, a phase delay unit in the second modulator arm, and a photodetector configured to detect an output optical signal of the nested Mach Zehnder optical modulator, the method comprising:

biasing the first modulator arm with a first value of a first bias point such that an output optical signal of a first type is at transmission null;

biasing the second modulator arm with a first value of a second bias point such that an output optical signal of a second type is at transmission null;

biasing the phase delay unit with a third bias point such that an output optical signal of the photodetector is at transmission null;

subsequent to biasing the first modulator arm, the second modulator arm and the phase delay unit, offsetting the first bias point from the first value of the first bias point and the second bias point from the first value of the second bias point; and dithering the third bias point and monitoring a characteristic of photocurrent generated by the photodetector.

* * * * *

UNITED STATES PATENT AND TRADEMARK OFFICE
CERTIFICATE OF CORRECTION

PATENT NO. : 9,853,737 B2
APPLICATION NO. : 14/615350
DATED : December 26, 2017
INVENTOR(S) : Christian Rasmussen et al.

It is certified that error appears in the above-identified patent and that said Letters Patent is hereby corrected as shown below:

In the Specification

In Column 4, Line 44, delete "$v_d(t) = 1740$" and replace it with --$v_d(t) = V_\pi i(t)$--.

In Column 6, Lines 13 and 16, "ϕ" should read --$\varphi$--; Line 21, "ϕ", each occurrence, should read --$\varphi$--; Lines 39, 41, and 57, "ϕ" should read --$\varphi$--.

In Column 7, Line 59, delete "ϕ" and replace it with --$\varphi$--.

In Column 8, Lines 14, 25, 41, 51, and 62, "ϕ", each occurrence, should read --$\varphi$--.

In Column 9, Lines 43, 44, and 49, "ϕ", each occurrence, should read --$\varphi$--; Line 66, "ϕ", each occurrence, should read --$\varphi$--.

In Column 10, Lines 3, 5, "ϕ", each occurrence, should read --$\varphi$--; Line 6, "ϕ", each occurrence, should read --$\varphi$--; Line 25, "ϕ" should read --$\varphi$--; Line 28, "ϕ", each occurrence, should read --$\varphi$--; Line 45, "ϕ" should read --$\varphi$--; Line 60, "ϕ" should read --$\varphi$--.

In Column 11, Lines 42-45, "ϕ", each occurrence, should read --$\varphi$--.

Signed and Sealed this
Twenty-second Day of January, 2019

Andrei Iancu
*Director of the United States Patent and Trademark Office*